Aug. 21, 1962 KUMAO SAKAMOTO 3,050,433

PROCESS FOR PRODUCING A RECORD DISC HAVING
A PICTORIAL ILLUSTRATION PRINTED THEREON

Filed Sept. 20, 1960

INVENTOR
Kumao Sakamoto
BY
ATTORNEY

United States Patent Office
3,050,433
Patented Aug. 21, 1962

3,050,433

PROCESS FOR PRODUCING A RECORD DISC HAVING A PICTORIAL ILLUSTRATION PRINTED THEREON

Kumao Sakamoto, 801 Kidera-cho, Nara-shi, Japan
Filed Sept. 20, 1960, Ser. No. 57,236
Claims priority, application Japan Sept. 2, 1960
1 Claim. (Cl. 156—219)

This invention relates to improvements in the process for producing record discs comprising a surface material which has been obtained by the application of a coating of transparent synthetic resin on top of a paper stock whereon has been printed a photograph or a picture. The invention is characterized in that as the surface material of a record a paper printed with a photograph or a picture to which surface has been applied a bonding liquid containing vinyl chloride followed by application of vinyl chloride in powder form is used, this surface material being pressed with a master record in accordance with known methods to produce sound records.

An object of this invention is to provide a process for readily applying to the surface of a paper printed with a photograph or a picture a durable, elastic and lustrous vinyl chloride coating whereby is obtained a hard, board-like record disc.

Another object of the invention is to provide for means of selecting readily, as may be desired, the hardness of the product by varying the mixing proportions of the starting materials of the bonding liquid. Moreover, since the vinyl chloride used in making the record discs in accordance with the process of the present invention do not contain any stabilizers, there being no electric chargeability present, the collection of dusts during playing of the record does not occur.

Figure 1:
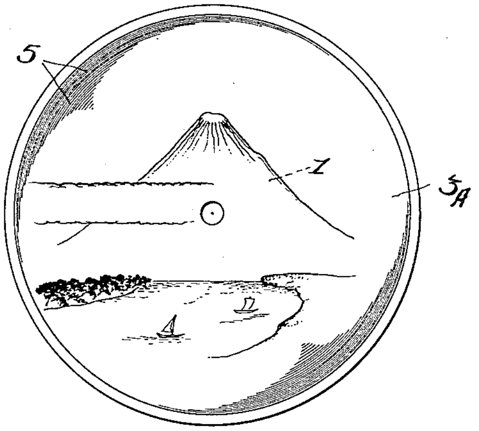
Figure 2:
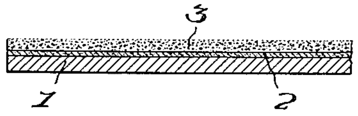
Figure 3:
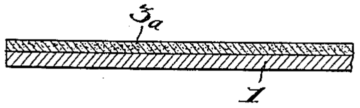
Figure 4:
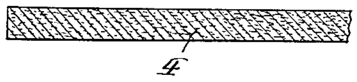
Figure 5:
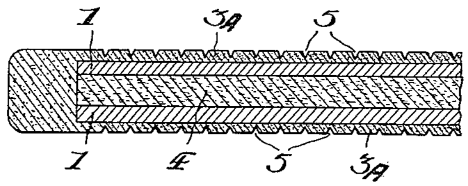

Other objects and features of the invention will be apparent from a consideration of the following detailed description taken with the accompanying drawings, wherein FIG. 1 is a top plan view illustrating an example of a record disc which has been produced in accordance with the process of the present invention;

FIGS. 2 to 5 are respectively fragmentary enlarged sectional views illustrating the various states during the production of the aforesaid record discs;

FIG. 2 being a vertical sectional view showing the state wherein after having applied a bonding liquid to a paper printed with a photograph or a picture powdered vinyl chloride has been sprinkled over and deposited thereon;

FIG. 3 being a vertical sectional view showing the state wherein the powdered vinyl chloride sprinkled on the paper surface has been pressed lightly with a low pressure roller;

FIG. 4 being an enlarged vertical sectional view showing the record disc core material; and FIGS. 5 being an enlarged vertical sectional view of the product record disc that has been obtained by placing the aforesaid surface material to the respective surfaces of core material and then by means of conventional record press operations sound grooves have been formed on the vinyl chloride layer surfaces of the surface material.

The following example illustrates the nature of the invention but is not intended to limit it in any manner except as it is limited in the appended claim.

First step (the step in which vinyl chloride powder is deposited on the record surface material made of paper) is as follows:

The liquid bonding agent to be applied first to the surface of the paper on which has been printed a photograph or picture is a mixture composed as follows—

| | Wt. percent |
|---|---|
| Main ingredient: Vinyl chloride resin | 10.0 |
| Solvent: Cyclohexanone | 10.0 |
| Diluent: Methyl ethyl ketone | 40.0 |
| Diluent: Xylol | 39.5 |
| Plasticizer: Dioctyl phthalate | 0.5 |

The above proportion of the mixture is however just one example. Particularly, as to the amount of the plasticizer, it may be either increased or decreased, as appropriate, with a corresponding decrease or increase in the amount of the diluent. In preparing this bonding agent, the cyclohexanone is first heated to about 100° C., and then the vinyl chloride powder is mixed with this. About 24 hours later, while continuing the stirring in a vacuum tank, the methyl ethyl ketone, xylol and dioctyl phthalate are added, and the mixture is stirred thoroughly, whereby the bonding agent is obtained.

As shown in FIG. 2, the aforesaid bonding liquid is applied, for example, by a spray to the surface of a peper 1 on which has been printed a color photograph or picture followed by sprinkling thereon of a vinyl chloride powder. The foregoing powder in excess that does not come in contact with the surface of the bonding liquid is blown off with an air blower. The paper, which has been thus covered with the vinyl chloride powder, is passed through a dryer where it is heated whereby the evaporable constituents contained therein are evaporated. Finally, by pressing lightly with a low pressure roller, perfect bonding of the vinyl chloride powder is effected, and thus, as shown in FIG. 3, a paper 1, having on its surface a powdered layer of vinyl chloride resin coating *3a* is obtained. In this instance, the degree of hardness of the resin coating on the surface material may be varied as desired by regulating the percentage contained of the dioctyl phthalate of the aforesaid bonding liquid.

Second step (the step for producing the core material of the record disc) is as follows:

The core material comprises a mixture of the following—

| | Wt. percent |
|---|---|
| Clay | 42 |
| Mica (80-mesh powder) | 17 |
| Zinc stearate | 10 |
| Copal gum | 10 |
| Coal-tar pitch | 10 |
| "Binzol" resin (tradename of Hercules Co., U.S.A.) | 18 |

The foregoing mixture was thoroughly mixed, then kneaded with a steam roller at 120° C. and thereafter made into a biscuit-shaped material 4 (FIG. 4) of about 150 grams each using spreading rollers.

Third step (the pressing operation of the record disc) is as follows:

A surface material obtained by the first step, above, is placed on the surface of the bottom master record of a press for producing records having top and bottom masters with its vinyl chloride powdered layer coated surface contiguous to the surface of the bottom master. Upon this is placed the core material produced by the second step, i.e., the biscuit-shaped material 4, followed by placing on top the other sheet of surface material with its vinyl chloride resin powdered layer coated surface *3a* facing upwards. Then the top and bottom masters are brought together to apply pressure while applying heat. After left to cool for a specified length of time and then by opening the top and bottom masters, as shown in FIG. 5, the completed record disc is obtained, which has been formed into an integral unit by sandwiching the aforesaid core material between surface materials comprising printed papers 1, 1, on which powdered vinyl chloride layers have been molten and become transparent coatings by application of heat and pressure, and thereby impressing on said resin layers 3A, 3A record sound grooves 5, 5.

Although the example described hereinabove is that relating to the production of double-faced records, needless to say, the invention can be adapted for production of single-faced records.

Having thus set forth the nature of the invention, what I claim herein is:

A process for producing a record disc having a pictorial illustration printed thereon which comprises coating the surface of paper stock whereon has been printed a pictorial illustration with a bonding liquid containing vinyl chloride, said bonding liquid having been obtained by heating cyclohexanone to about 100° C., adding and mixing therewith vinyl chloride powder followed by adding methyl ethyl ketone and xylol, then mixing further dioctyl phthalate and stirring; sprinkling vinyl chloride powder uniformly on the paper whose surface has been thus coated with a layer of bonding liquid; pressing said paper lightly with heated rolls to bond said powder to the surface of said paper; and thereafter tiering said paper with a core material and placing the foregoing in a record press, then pressing said vinyl chloride powdered layer to form a surface coating and thereafter impressing sound grooves upon said vinyl chloride coated surface.

References Cited in the file of this patent

UNITED STATES PATENTS

| | | |
|---|---|---|
| 2,184,524 | Hofmann | Dec. 26, 1939 |
| 2,403,077 | Hershberger | July 2, 1946 |
| 2,528,611 | Saffady | Nov. 7, 1950 |

FOREIGN PATENTS

| | | |
|---|---|---|
| 631,850 | Great Britain | Nov. 10, 1949 |